(12) United States Patent
Anderson

(10) Patent No.: US 8,997,626 B2
(45) Date of Patent: Apr. 7, 2015

(54) ELECTRO-HYDRAULIC ACTUATOR INCLUDING A RELEASE VALVE ASSEMBLY

(75) Inventor: David J. Anderson, Plymouth, MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 945 days.

(21) Appl. No.: 13/079,968

(22) Filed: Apr. 5, 2011

(65) Prior Publication Data

US 2011/0248196 A1    Oct. 13, 2011

Related U.S. Application Data

(60) Provisional application No. 61/321,647, filed on Apr. 7, 2010.

(51) Int. Cl.
| | | |
|---|---|---|
| *F16K 31/12* | (2006.01) | |
| *F16K 17/04* | (2006.01) | |
| *F15B 15/18* | (2006.01) | |
| *F16K 15/04* | (2006.01) | |
| *F16K 17/08* | (2006.01) | |

(52) U.S. Cl.
CPC .............. *F16K 17/0406* (2013.01); *F15B 15/18* (2013.01); *F16K 15/044* (2013.01); *F16K 17/08* (2013.01); *F15B 2211/20515* (2013.01); *F15B 2211/20561* (2013.01); *F15B 2211/3051* (2013.01); *F15B 2211/50527* (2013.01); *F15B 2211/785* (2013.01)

(58) Field of Classification Search
CPC ...... F15B 13/021; F15B 15/18; F15B 15/202; F15B 2211/3058; F15B 2211/20561; F15B 15/044; F15B 2211/20515; F15B 2211/3051; F15B 2211/50527; F15B 2211/785; F16K 17/0406; F16K 17/08; F16K 15/044
USPC ................................ 91/437, 440; 60/473, 476
See application file for complete search history.

(56) References Cited

U.S. PATENT DOCUMENTS

| | | | |
|---|---|---|---|
| 2,505,809 A | 5/1950 | Svenson | |
| 2,795,932 A | 6/1957 | McLuen | |
| 3,630,025 A | 12/1971 | Henry | |
| 4,056,160 A | 11/1977 | Abels et al. | |
| 4,117,678 A | 10/1978 | Turner et al. | |
| 4,132,071 A | 1/1979 | Priese et al. | |
| 6,126,401 A | 10/2000 | Latham | |
| 7,806,142 B2 * | 10/2010 | Baros et al. | 137/878 |
| 2007/0240776 A1 | 10/2007 | Mizui | |
| 2011/0011257 A1 * | 1/2011 | Casassa | 92/165 R |

\* cited by examiner

*Primary Examiner* — Dwayne J White
*Assistant Examiner* — Logan Kraft
(74) *Attorney, Agent, or Firm* — Renner, Otto, Boisselle & Sklar, LLP

(57) ABSTRACT

A manual release valve is provided for a electro-hydraulic actuator of the type including a piston movable in a cylinder and defining a piston side chamber and a rod side chamber, the valve threadedly attached to the housing of the actuator and extending at least partially within the fluid housing conduits, the valve moveable from a closed position fully seated in the housing to an open position for fluidly connecting both the piston side chamber and the rod side chamber to the reservoir, the valve further including a pressure relief portion that is operable when the valve is in the closed position for relieving pressure from at least one of the piston side chamber or the rod side chamber.

14 Claims, 5 Drawing Sheets

ELECTRO-HYDRAULIC ACTUATOR INCLUDING A RELEASE VALVE ASSEMBLY

CROSS REFERENCE TO RELATED APPLICATIONS

The present application claims the benefit of the filing date of U.S. Provisional Patent Application Ser. No. 61/321,647, filed Apr. 7, 2010, the disclosure of which is incorporated herein by reference in its entirety.

FIELD OF INVENTION

The present invention relates to an electro-hydraulic actuator having a release valve assembly.

BACKGROUND OF THE INVENTION

Electro-hydraulic actuators are generally known. A typical electro-hydraulic actuator includes an electric motor that drives a hydraulic pump to move fluid from a reservoir to a hydraulic actuator for actuating the actuator. When the electric motor is driven in a first rotational direction, the hydraulic fluid moved by the hydraulic pump extends a rod of the actuator. When the electric motor is driven in a second rotational direction, opposite the first rotational direction, the hydraulic fluid moved by the hydraulic pump retracts the rod of the actuator.

The components of an electro-hydraulic actuator are supported in a housing. The housings of many known electro-hydraulic actuators include a first portion for the actuator and a second portion, connected to the first portion, for the electric motor, hydraulic pump, and reservoir. Fluid passages are formed in the housing such that a complete hydraulic circuit is contained within the housing.

Electro-hydraulic actuators commonly are used for moving items between first and second positions. In one example, an electro-hydraulic actuator may be used to move a motor for a motor boat between trim positions. In another example, the electro-hydraulic actuator may be used to move a door, such as an armored door that is difficult to move manually. In the event of a power loss or other event that results in a failure of motion of the actuator of the electro-hydraulic actuator, a manual release for enabling manual movement of the actuator (or item attached to the actuator) is desired.

SUMMARY OF THE INVENTION

At least one embodiment of the present invention provides an electro-hydraulic actuator having: a hydraulic pump; an electric motor operatively connected to the hydraulic pump and operable for driving the pump; an actuator moveable in response to fluid flow from the pump, the actuator including a piston movable in a cylinder and defining a piston side chamber and a rod side chamber; a housing for the pump, electric motor and actuator and including a reservoir, the housing including fluid conduits for connecting the reservoir, the pump and the piston side and rod side chambers of the actuator; and a valve actuatable from a closed position to an open position for fluidly connecting both the piston side chamber and the rod side chamber to the reservoir, the valve further including a pressure relief portion that is operable when the valve is in the closed position for relieving pressure from at least one of the piston side chamber or the rod side chamber.

At least one embodiment of the present invention provides an electro-hydraulic actuator having: a hydraulic pump; an electric motor operatively connected to the hydraulic pump and operable for driving the pump; an actuator moveable in response to fluid flow from the pump, the actuator including a piston movable in a cylinder and defining a piston side chamber and a rod side chamber; a housing for the pump, electric motor and actuator and including a reservoir, the housing including fluid conduits for connecting the reservoir, the pump and the piston side and rod side chambers of the actuator; and a valve positioned at least partially within the fluid housing conduits, the valve actuatable from a closed position to an open position for fluidly connecting both the piston side chamber and the rod side chamber to the reservoir, the valve includes an outer body and an inner body that is receivable in the outer body, the valve further including a pressure relief portion that is operable when the valve is in the closed position for relieving pressure from at least one of the piston side chamber or the rod side chamber, the pressure relief portion of the valve being located within the outer body and including a spring that is biased against the inner body and biases a ball against an axial passage through an end of the outer body.

At least one embodiment of the present invention provides an An electro-hydraulic actuator having: a hydraulic pump; an electric motor operatively connected to the hydraulic pump and operable for driving the pump; an actuator moveable in response to fluid flow from the pump, the actuator including a piston movable in a cylinder and defining a piston side chamber and a rod side chamber; a housing for the pump, electric motor and actuator and including a reservoir, the housing including fluid conduits for connecting the reservoir, the pump and the piston side and rod side chambers of the actuator; and a manual release valve threadedly attached to the housing and extending at least partially within the fluid housing conduits, the valve moveable from a closed position fully seated in the housing to an open position for fluidly connecting both the piston side chamber and the rod side chamber to the reservoir, the valve further including a pressure relief portion that is operable when the valve is in the closed position for relieving pressure from at least one of the piston side chamber or the rod side chamber.

BRIEF DESCRIPTION OF THE DRAWINGS

Embodiments of this invention will now be described in further detail with reference to the accompanying drawings, in which.

DETAILED DESCRIPTION OF THE DRAWINGS

Figure 1:
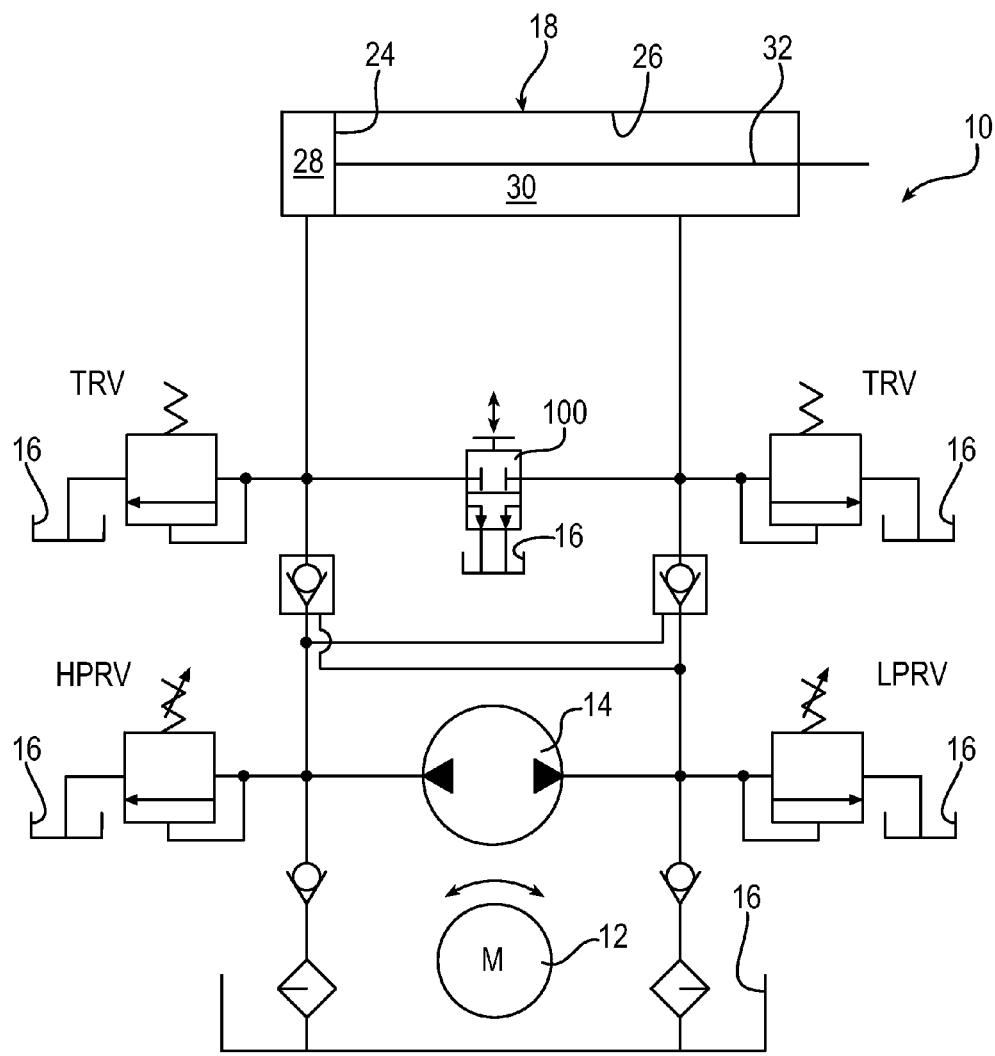
FIG. 1 is a schematic illustration of an electro-hydraulic actuator 10 including a manual release valve assembly constructed in accordance with an embodiment of the present invention.

FIG. 1 is a schematic illustration of an electro-hydraulic actuator 10 including a manual release valve assembly 100 constructed in accordance with the present invention. The electro-hydraulic actuator 10 includes an electric motor 12 that is operatively coupled to a hydraulic pump 14. The electric motor 12 is operable for driving the hydraulic pump 14 in opposite first and second rotational directions for driving the hydraulic pump. The hydraulic pump 14 draws fluid from a reservoir 16 and provides the fluid to an actuator 18. The actuator 18 includes a piston 24 that is movably mounted within a cylinder bore 26. The piston 24 divides the cylinder bore 26 into first and second chambers 28 and 30, respectively. The first chamber 28 may be referred to as a piston (or head) side chamber and, the second chamber 30 may be referred to as a rod side chamber. A rod 32 of the actuator 18 which is affixed to or integral to the piston 24 extends through the second chamber 30 and outwardly of a housing 40 (FIG. 2) of the electro-hydraulic actuator 10.

The electro-hydraulic actuator 10 is operable for extending or retracting the rod 32 relative to the housing 40 for causing relative movement of two structures, one attached to the housing and the other attached to the rod. To extend the rod 32 of the electro-hydraulic actuator 10, the electric motor 12 is operated to drive the hydraulic pump 14 in a first rotational direction causing hydraulic fluid drawn from the reservoir 16 and chamber 36 to be directed into the first chamber 28 of the actuator 18. The fluid directed into the first chamber 28 creates a pressure differential between the first and second chambers 28 and 30 of the actuator 18 that moves the piston 24 to increase the volume of the first chamber 28 and decrease the volume of the second chamber 30, thus extending the rod 32. To retract the rod 32, the electric motor 12 is operated to drive the hydraulic pump 14 in a second rotational direction, opposite the first rotational direction, causing hydraulic fluid drawn from the chamber 28 to be directed into the second chamber 30 of the actuator 18. The fluid directed into the second chamber 30 creates a pressure differential in which the pressure in the second chamber is higher than that in the first chamber 28. As a result of the differential pressure, the piston 24 moves to increase the volume of the second chamber 30 and decrease the volume of the first chamber 28, thus retracting the rod 32.

Figure 2:
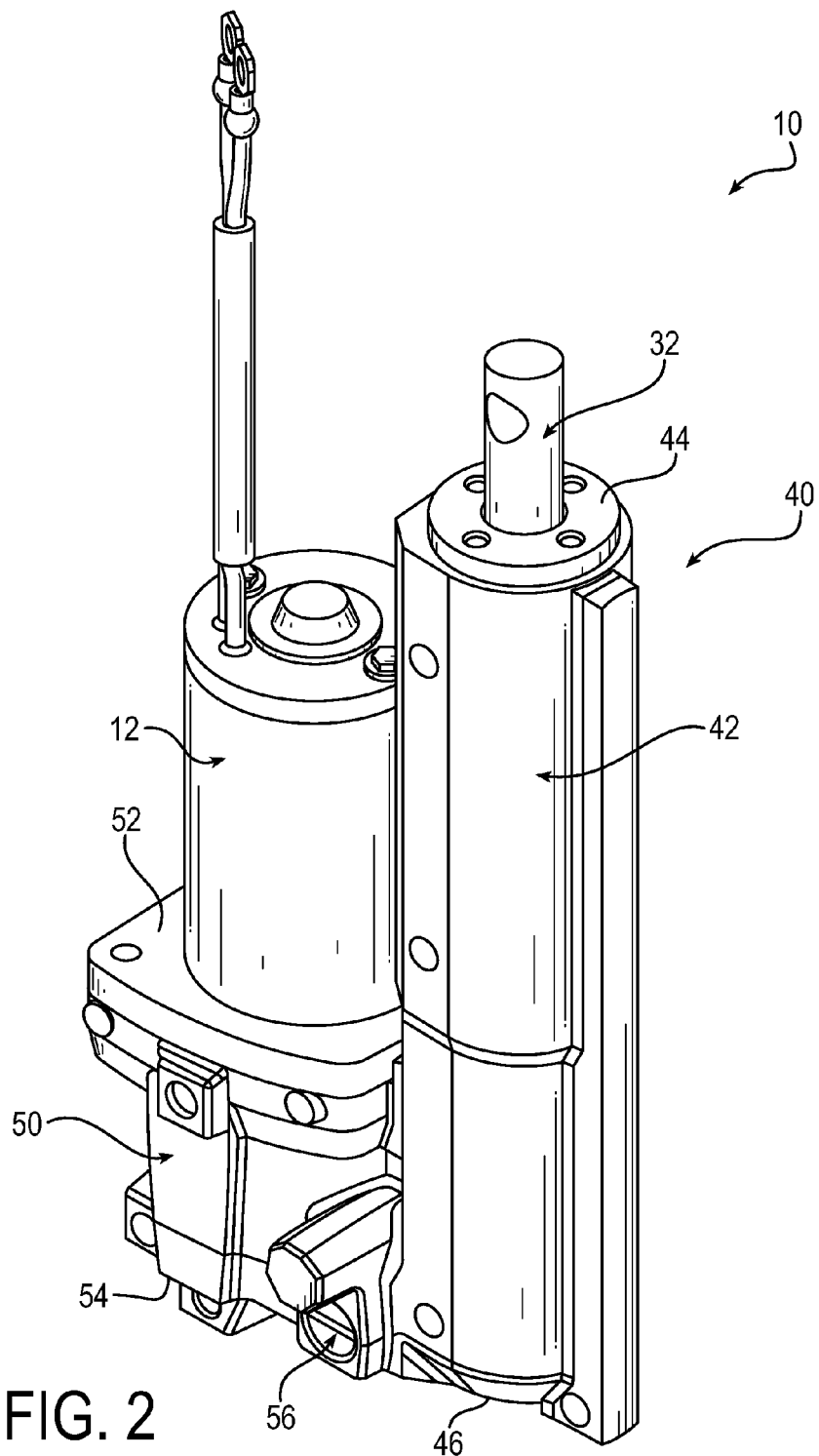
FIG. 2 is a perspective view of an assembled electro-hydraulic actuator in accordance with an embodiment of the present invention.
Figure 3:
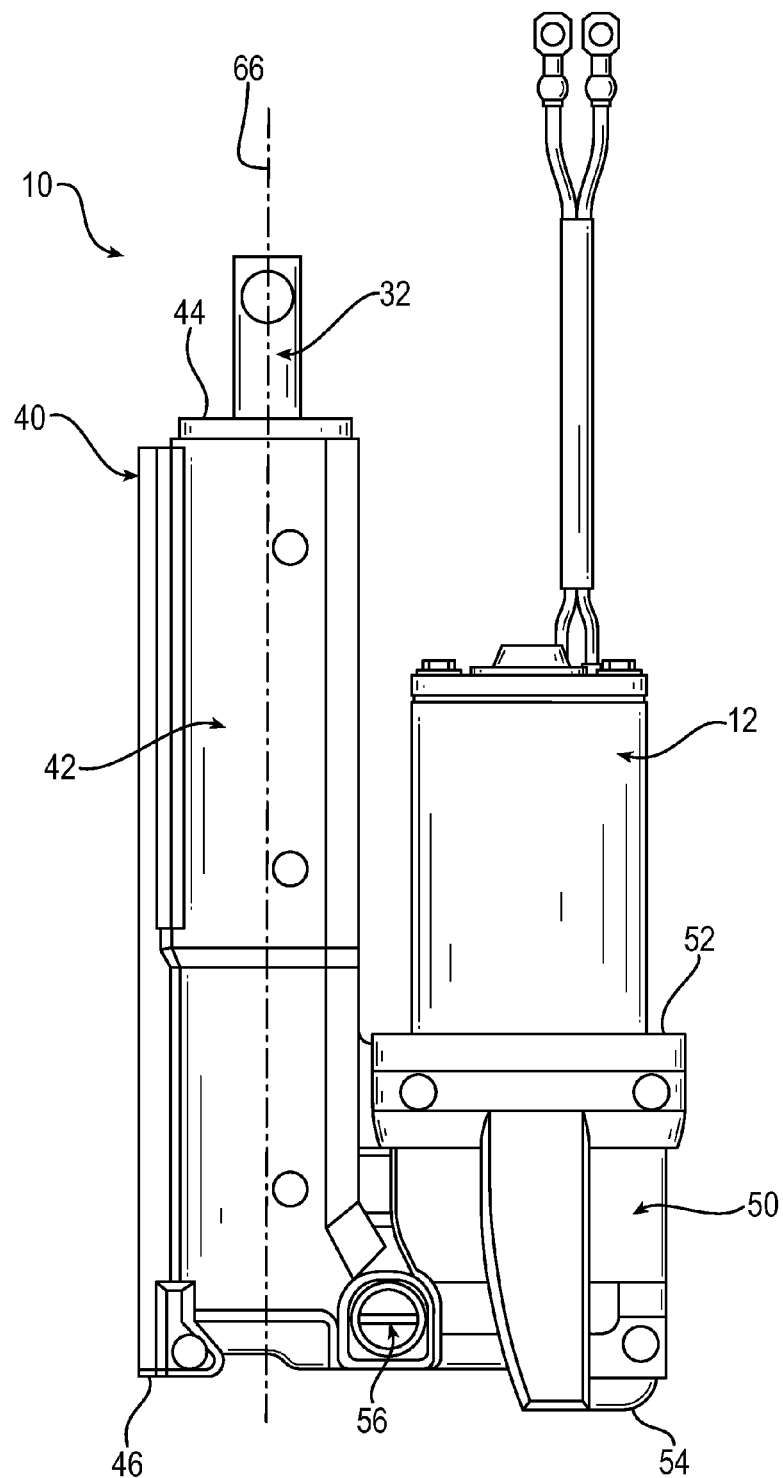
FIG. 3 is a side elevational view of an assembled electro-hydraulic actuator in accordance with an embodiment of the present invention.

FIGS. 2 and 3 illustrate an assembled electro-hydraulic actuator 10. As shown in FIG. 2, the electro-hydraulic actuator 10 includes a housing 40. The housing 40 includes (i) an actuator portion 42 having opposite first and second ends 44 and 46 (FIG. 3), respectively, and (ii) a drive device portion 50 having opposite first and second ends 52 and 54, respectively. As best shown in FIG. 3, the actuator portion 42 and drive device portion 50 of the housing 40 are interconnected adjacent their respective second ends 46 and 54. Fluid flow conduits located internal to the housing 40 extend between the actuator portion 42 and the drive device portion 50. Flow control devices, such as valves, may be associated with these fluid flow conduits for controlling fluid flow through the housing. FIGS. 2-3 illustrate one of the valves at reference numeral 56.

The drive device portion 50 of the housing 40 supports the drive components of the electro-hydraulic actuator 10. The drive components include at least the electric motor 12 and a hydraulic pump 14. In an exemplary embodiment, the hydraulic pump 14 is a gerotor type pump that is located within the drive device portion 50 of the housing 40. Those skilled in the art will recognize that any one of various types of hydraulic pumps may be used. In the embodiment of FIGS. 1-3, the reservoir 16 is also located within the drive device portion 50 of the housing 40 adjacent the second end 54. Also, as illustrated, the housing of the electric motor 12 extends outwardly of a first end 52 of the drive device portion 50 of the housing 40. Those skilled in the art will recognize that a separate reservoir, such as a plastic reservoir, may be used with the electro-hydraulic actuator 10. Further, the motor 12 may be located, if desired, within the drive device portion 50 of the housing 40, in which case the drive device portion may be elongated relative to that illustrated. For simplifying the packaging, the drive device portion 50 of the electro-hydraulic actuator 10 illustrated includes an integral reservoir 16 that is cast in the drive device portion during casting of the housing 40.

An interior surface of the actuator portion 42 of the housing 40 defines the cylinder bore 26 of the electro-hydraulic actuator 10. The cylinder bore 26 extends into the actuator portion 42 of the housing 40 from the first end 44 and terminates at an end wall (not shown) located a spaced distance from the second end 46. Various sealing components and closure methods may be used for closing the opening to the cylinder bore 26 located on first end 44 of the actuator portion 42 and sealing about the rod 32, when installed. The cylinder bore 26 may be cast in the actuator portion 42 during casting of the housing 40 and later machined to its desired diameter.

As set forth above, a piston 24 is located in the cylinder bore 26 of the assembled electro-hydraulic actuator 10 for dividing the cylinder bore into the first and second chambers 28 and 30. Various known sealing methods for sealing the circumference of the piston 24 may be used to prevent fluid flow between the first and second chambers 28 and 30. Movement of the piston 24 upward, as viewed in FIG. 1, results in an extension of the rod outwardly of the first end 44 of the actuator portion 42. Movement of the piston 24 downward, as viewed in FIG. 1, results in a retraction of the rod 32 relative to the first end 44 of the actuator portion 42 of the housing 40.

Figure 4:
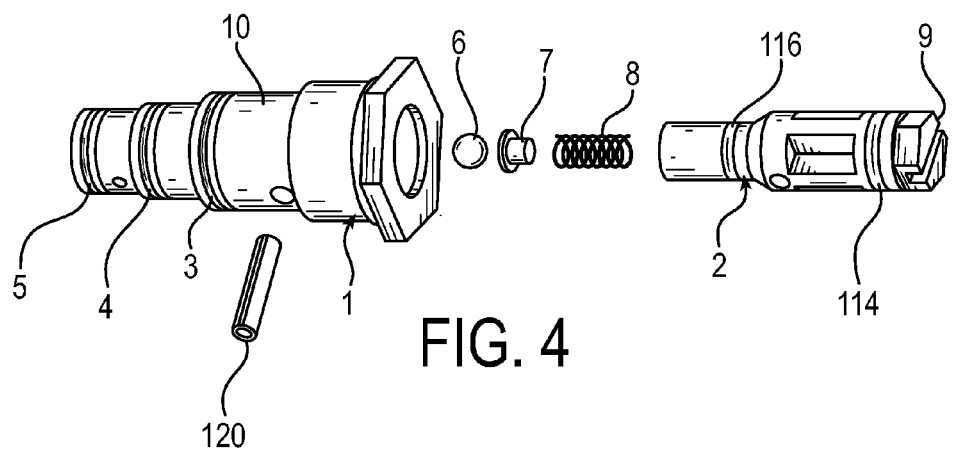
FIG. 4 is an exploded view of the manual release valve assembly in accordance with an embodiment of the present invention.
Figure 5:
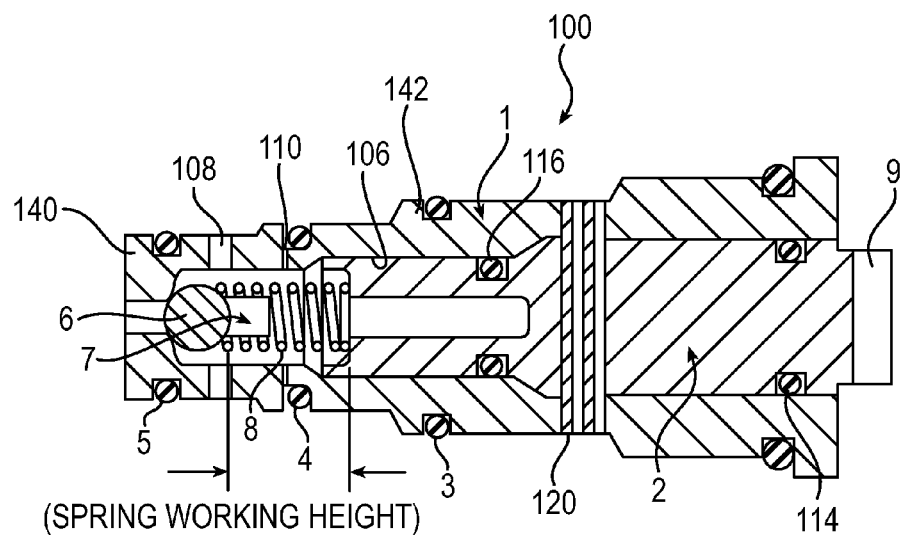
FIG. 5 is a cross-sectional view of the assembled manual release valve assembly in accordance with an embodiment of the present invention.

FIGS. 4 and 5 illustrate the manual release valve assembly 100. FIG. 4 is an exploded view of the manual release valve assembly 100 and, FIG. 5 is an assembled view of the manual release valve assembly 100. The manual release valve assembly 100 includes of an outer body 1 and inner body 2. The outer and inner bodies 1 and 2 may be formed from metal, plastic or any other suitable material. The outer body 1 includes an axially extending passage 106, a radially extending passage 108 and a radial bleed hole 110. The outer body 1 also includes three axially spaced seal grooves for receiving seals, indicated in FIGS. 4 and 5 by reference numerals 3, 4, and 5. The radial bleed hole 110 intersects the seal groove for seal 4. The inner body 2 includes two axially spaced seal grooves for receiving seal 5, indicated in FIGS. 4 and 5 by reference numerals 114 and 116. The manual release valve 100 also includes a pressure valve having a ball 6, spring 8, and an eyelet 7. Other embodiments of pressure relief valves are contemplated by this invention. Additionally, the outer body 1 and the inner body 2 include corresponding cross-bores for receiving a lock pin, 120 which locks the outer and inner bodies together.

Figure 6:
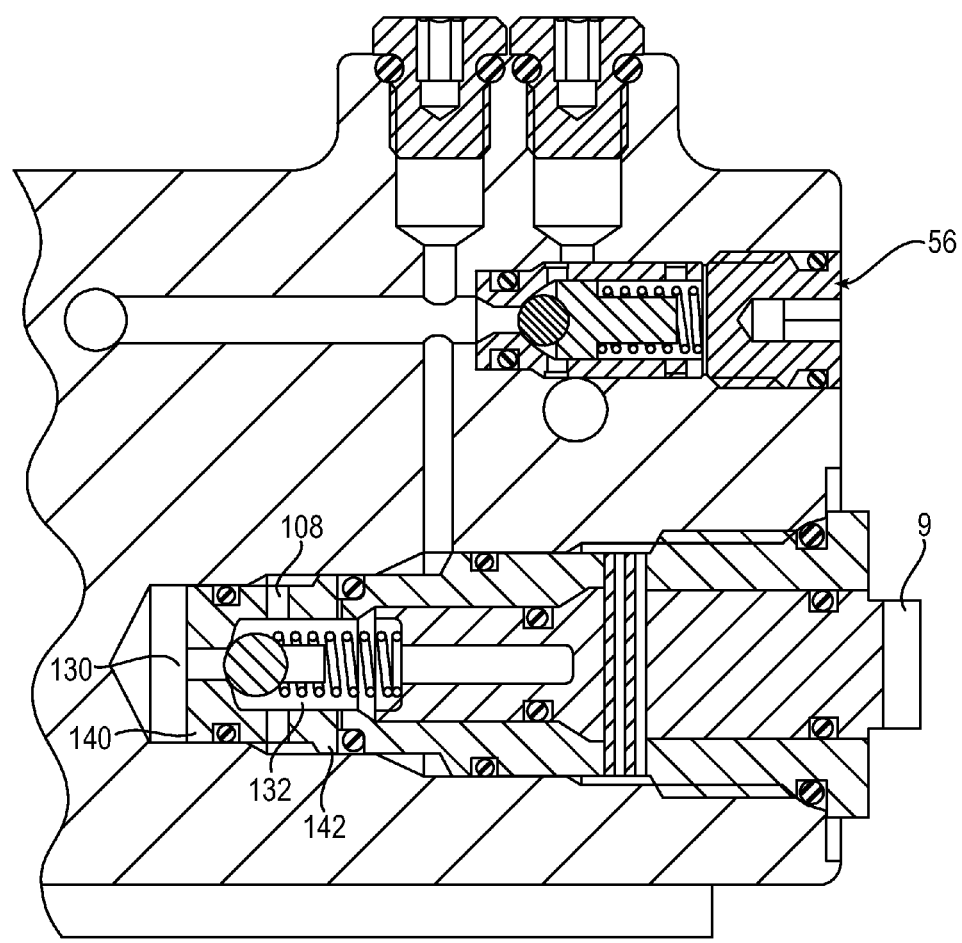
FIG. 6 is a cross-sectional view of the manual release valve assembly threadedly inserted into a housing of the electro-hydraulic actuator.

The outer body 1 includes threads for enabling the manual release valve assembly 100 to be threadedly inserted into a housing, such as housing 40 of the electro-hydraulic actuator 10 as is illustrated in FIG. 6. When assembled into the housing 40, the pressure relief valve separates a chamber 130 connected to the rod side chamber 30 of the actuator 18 from a chamber 132 connected to reservoir 16 via passage 108. An increase in fluid pressure in chamber 130 connected to the rod side chamber 30 will result in the ball 6 (or other closure member) being moved to a position to allow flow from the rod side chamber 30 to the reservoir 16.

One purpose of the manual release valve assembly 100 is to relieve pressure from the rod side chamber 30 to reservoir 16. This is accomplished by the pressure relief valve. For example, if the electro-hydraulic actuator 10 is used in a marine trim system, heat from the sun may result in an increase in the pressure of the hydraulic fluid. The pressure relief valve relieves the excess pressure to reservoir 16.

Another purpose of the manual release valve assembly 100 is to allow a manual opening of conduits from both the piston side chamber 28 and the rod side chamber 30 of the actuator 18 to the reservoir 16. When these conduits are opened, the rod 32 of the actuator 18 may be manually moved. For example, in a marine trim system, the manual release valve assembly 100 may be opened when the engine is not running arid there is no external load on the actuator. But, because the electro-hydraulic actuator 10 has zero leak, load holding checks, the actuator 18 can become hydraulically locked at the end of the piston's travel.

The valve assembly 100 is actuated by backing the outer and inner bodies 1 and 2 out of the housing 40 by turning a screw head or hex head 9 a few turns. As the outer and inner bodies 1 and 2 are affixed together with the lock pin 120, this turning moves the entire valve assembly 100 outward relative to the body 40. As the valve assembly 100 moves outwardly to a larger diameter portion of a bore of the housing 40, pressure tends to act to pull seal 4 out of its associated seal groove. Pressure relief through the radial bleed hole 10 acts to prevent seal 4 from being removed from its associated seal groove. Although not shown in the drawings, other seal grooves optionally may have similar bleed holes. When the valve assembly 100 is removed a sufficient distance, fluid pressure may flow around an end portion 140 of the outer body 1 for fluidly connecting the rod side chamber 30 and the reservoir 16 and, fluid may flow around a radial boss portion 142 of the outer body 1 for fluidly connecting the piston side chamber 28 and the reservoir 16.

Although the above embodiment specifically discusses a manual release valve assembly 100, the valve assembly may include an automatic actuator such as a solenoid.

Although the principles, embodiments and operation of the present invention have been described in detail herein, this is not to be construed as being limited to the particular illustrative forms disclosed. They will thus become apparent to those skilled in the art that various modifications of the embodiments herein can be made without departing from the spirit or scope of the invention.

What is claimed is:

1. An electro-hydraulic actuator having:
   a hydraulic pump;
   an electric motor operatively connected to the hydraulic pump and operable for driving the pump;
   an actuator moveable in response to fluid flow from the pump, the actuator including a piston movable in a cylinder and defining a piston side chamber and a rod side chamber;
   a housing for the pump, electric motor and actuator and including a reservoir, the housing including fluid conduits for connecting the reservoir, the pump and the piston side and rod side chambers of the actuator; and
   a valve actuatable from a closed position to an open position for fluidly connecting both the piston side chamber and the rod side chamber to the reservoir, the valve further including a pressure relief portion that is operable when the valve is in the closed position for relieving pressure from at least one of the piston side chamber or the rod side chamber; and
   wherein the valve includes an outer body in which the pressure relief portion is located;
   wherein the outer body includes a plurality of annular grooves formed thereon, each groove having an annular seal positioned therein; and
   wherein at least one radial bleed hole is provided through the outer body at at least one of the grooves, the one radial bleed hole providing limited pressure relief when the valve is being moved to the open position to prevent the respective seal from being removed by pressure from the respective groove.

2. The electro-hydraulic actuator of claim 1 comprising an inner body that is receivable in the outer body, and wherein the pressure relief portion of the valve includes a spring that is biased against the inner body.

3. The electro-hydraulic actuator of claim 2 wherein the outer body is threadedly attached to the housing.

4. The electro-hydraulic actuator of claim 2 wherein the outer body is coupled to the inner body.

5. The electro-hydraulic actuator of claim 1 wherein the at least one radial bleed hole includes a plurality of radial bleed holes through the outer body at the at least one of the grooves.

6. An electro-hydraulic actuator having:
   a hydraulic pump;
   an electric motor operatively connected to the hydraulic pump and operable for driving the pump;
   an actuator moveable in response to fluid flow from the pump, the actuator including a piston movable in a cylinder and defining a piston side chamber and a rod side chamber;
   a housing for the pump, electric motor and actuator and including a reservoir, the housing including fluid conduits for connecting the reservoir, the pump and the piston side and rod side chambers of the actuator; and
   a valve positioned at least partially within the fluid housing conduits, the valve actuatable from a closed position to an open position for fluidly connecting both the piston side chamber and the rod side chamber to the reservoir, the valve includes an outer body and an inner body that is receivable in the outer body, the valve further including a pressure relief portion that is operable when the valve is in the closed position for relieving pressure from at least one of the piston side chamber or the rod side chamber, the pressure relief portion of the valve being located within the outer body and including a spring that is biased against the inner body and biases a ball against an axial passage through an end of the outer body;
   wherein the outer body includes plurality of annular grooves formed thereon, each groove having an annular seal positioned therein; and
   wherein at least one radial bleed hole is provided through the outer body at at least one of the grooves, the one radial bleed hole providing limited pressure relief when the valve is being moved to the open position to prevent the respective seal from being removed by pressure from the respective groove.

7. The electro-hydraulic actuator of claim 6 wherein the outer body is threadedly attached to the housing.

8. The electro-hydraulic actuator of claim 6 wherein the outer body is coupled to the inner body.

9. The electro-hydraulic actuator of claim 6 wherein the at least one radial bleed hole includes a plurality of radial bleed holes through the outer body at the at least one of the grooves.

10. An electro-hydraulic actuator having:
    a hydraulic pump;
    an electric motor operatively connected to the hydraulic pump and operable for driving the pump;

an actuator moveable in response to fluid flow from the pump, the actuator including a piston movable in a cylinder and defining a piston side chamber and a rod side chamber;

a housing for the pump, electric motor and actuator and including a reservoir, the housing including fluid conduits for connecting the reservoir, the pump and the piston side and rod side chambers of the actuator; and a manual release valve threadedly attached to the housing and extending at least partially within the fluid housing conduits, the valve moveable from a closed position fully seated in the housing to an open position for fluidly connecting both the piston side chamber and the rod side chamber to the reservoir, the valve further including a pressure relief portion that is operable when the valve is in the closed position for relieving pressure from at least one of the piston side chamber or the rod side chamber; and wherein the manual release valve includes an outer body in which the pressure relief sortion is located;

wherein the outer body includes a plurality of annular grooves formed thereon, each goove having an annular seal positioned therein; and wherein at least one radial bleed hole is provided through the outer body at at least one of the grooves, the one radial bleed hole providing limited pressure relief when the valve is being moved to the open position to prevent the respective seal from being removed by pressure from the respective groove.

11. The valve of claim 10, wherein the valve is rotated a predetermined amount to move from the closed position to the open position.

12. The electro-hydraulic actuator of claim 10 wherein the valve includes an inner body that is receivable in the outer body, the pressure relief portion of the valve incudes a spring that is biased against the inner body.

13. The electro-hydraulic actuator of claim 12 wherein the outer body is coupled to the inner body.

14. The electro-hydraulic actuator of claim 10 wherein the at least one radial bleed hole includes a plurality of radial bleed holes through the outer body at the at least one of the grooves.

* * * * *